April 9, 1963

J. B. WALKER 3,084,600

ROCKET LAUNCHERS

Filed Feb. 1, 1961

INVENTOR
John B. Walker
BY Martha L. Ross
AGENT

April 9, 1963  J. B. WALKER  3,084,600
ROCKET LAUNCHERS
Filed Feb. 1, 1961  3 Sheets-Sheet 2

INVENTOR
John B. Walker
BY
Martha L. Ross
AGENT

April 9, 1963  J. B. WALKER  3,084,600

Filed Feb. 1, 1961

ROCKET LAUNCHERS

INVENTOR

John B. Walker

BY Martha L. Ross

AGENT

United States Patent Office 3,084,600
Patented Apr. 9, 1963

3,084,600
ROCKET LAUNCHERS
John B. Walker, Arlington, Va., assignor to Atlantic Research Corporation, a corporation of Virginia
Filed Feb. 1, 1961, Ser. No. 86,353
4 Claims. (Cl. 89—1.7)

The present invention relates in general to launching piston assemblies for rocket launchers of the type arranged to effect an entrapment of gases aft of the rocket to exert expelling forces against the launching piston, and more particularly to a one-piece piston assembly for use in such launchers.

Heretofore, the more common types of rocket launchers have been of the open breech variety which were of such construction that the exhaust gases produced by the rocket motor after ignition pass freely to the surrounding atmosphere. If it is desired to provide additional launching thrust for increasing the launching velocity and range of the rocket, the use of booster rockets has been usually resorted to.

Additionally, the use of closed breech rocket launchers has been proposed, particularly for use under conditions which prevent use of an open breech launcher, as in tank turrets and like installations. Such launchers usually involve a uniform diameter launcher tube wherein a rocket is initially positioned with its trailing end immediately adjacent the closed breech of the launcher tube. While the use of such closed breech launchers will inherently result in some entrapment of exhaust gases in the breech zone of the launcher tube which will provide a rapidly increasing pressure in this zone acting to expel the rocket from the launcher tube if the rocket walls lie closely adjacent the walls of the launcher tube, it has been recognized that such an arrangement is attended by decided disadvantages. For example, the exhaust gases trapped in the tube have been found to produce disturbing effects when the rocket leaves the muzzle of the launcher tube and the acceleration forces produced by the pressure rise of the trapped exhaust gases occur in impulses resulting in uneven acceleration. It has been found, for example, that there is a very short duration initial pressure rise and acceleration force immediately upon ignition of the rocket motor until the rocket is set into rapid motion up the launcher tube, and that this rapid initial motion of the rocket produces a rapid increase in the volume behind it resulting in a sharp reduction in pressure and acceleration force. For many applications, also, the initial acceleration produced by the combustion gas entrapped in this small breech volume is excessive.

A rocket launcher system designed to impart a high launch velocity to a rocket by employing the exhaust gases entrapped in a large volume chamber communicating with the breech end of the launcher tube to provide additional launching thrust and maintain substantially even acceleration is disclosed in the prior application S.N. 855,845 filed November 27, 1959, jointly by Roland C. Webster and others. This prior rocket launcher system involved the rise of a piston releasably coupled to the trailing or aft end of the rocket motor nozzle which responds to the pressure generated in the gas accumulating volume by the entrapped rocket motor exhaust gases to produce the additional thrust forces assisting the rocket motor reaction thrust in expelling of the rocket from the launcher tube and then falls away from the rocket after exit from the launcher. The specific seperable piston construction disclosed in the above-identified patent application was in the form of a split piston having a pair of mating or complementary piston halves connected together by a hinge strap which permitted the portions of the split piston halves which held the piston to the rocket to swing open when the piston left the launcher and release the piston from the rocket. However, improvement in the specific piston construction has been sought to avoid any possibility of defective operation such as one half of the piston remaining attached to the rocket slightly longer than the other, which would induce an unbalanced drag force causing the rocket to veer from its prescribed course.

An object of the present invention, therefore, is the provision of a novel piston assembly for use with rocket launchers of the above-described type, wherein more reliable separation of the launching piston from the rocket is achieved after exit of the rocket from the launcher tube.

Another object of the invention is the provision of a novel launcher piston of the type described in the preceding paragraph, wherein the piston is formed of a one-piece, cup-shaped casting and an attaching mechanism is provided which responds to pressure of entrapped gases aft of the piston when the piston is still in the launcher tube to decouple the piston from the rocket while still permitting the piston to exert expelling forces against the rocket.

Other objects, advantages, and capabilities of the present invention will become apparent from the following detail description, taken in conjunction with the accompanying drawings illustrating a preferred embodiment of the invention.

Figure 1:
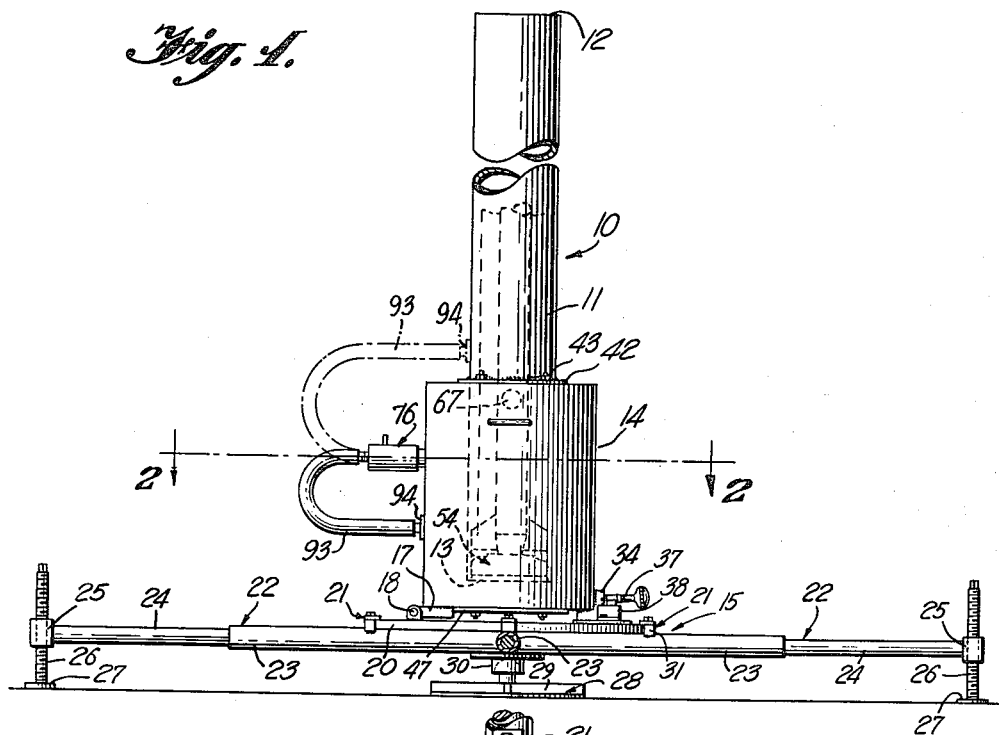
FIGURE 1 is a side elevation of a rocket launcher of the type with which the novel launching piston assembly of the present invention is used.
Figure 2:
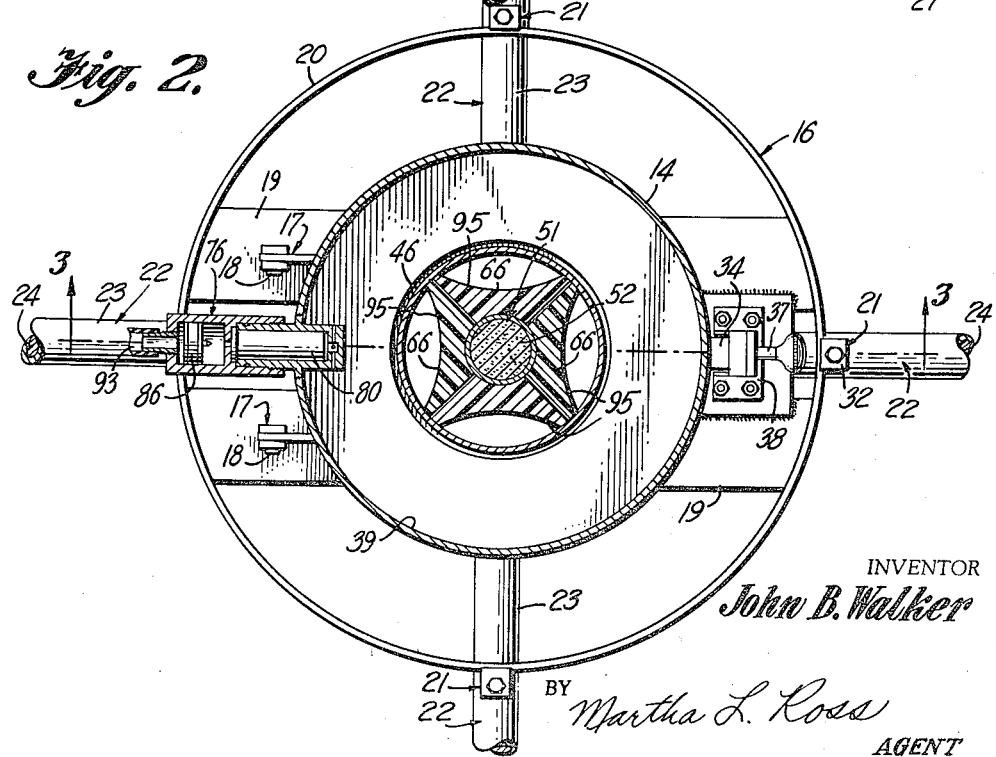
FIGURE 2 is a horizontal, transverse section view of the rocket launcher, taken along the line 2—2 of FIGURE 1.
Figure 3:
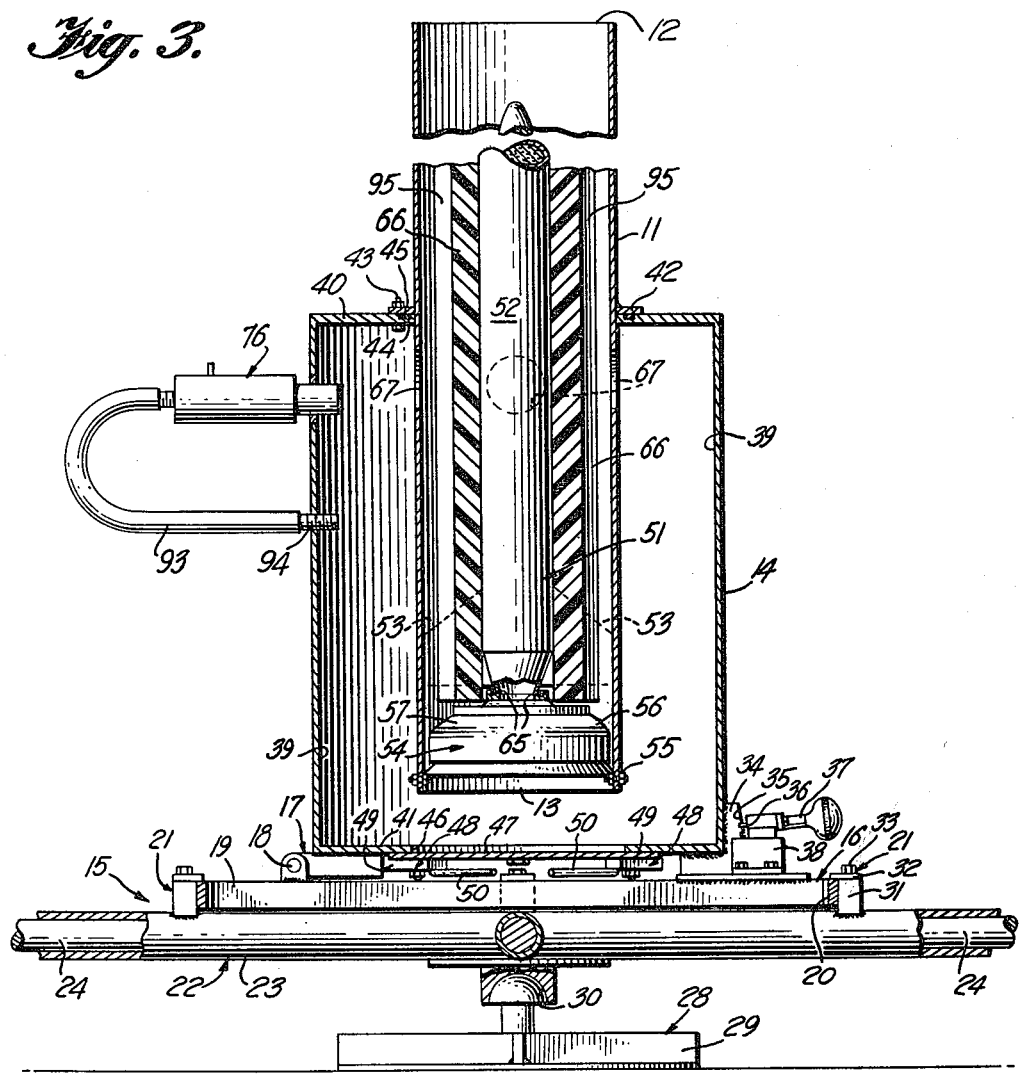
FIGURE 3 is a vertical section view of the rocket launcher, taken along the line 3—3 of FIGURE 2.
Figure 6:
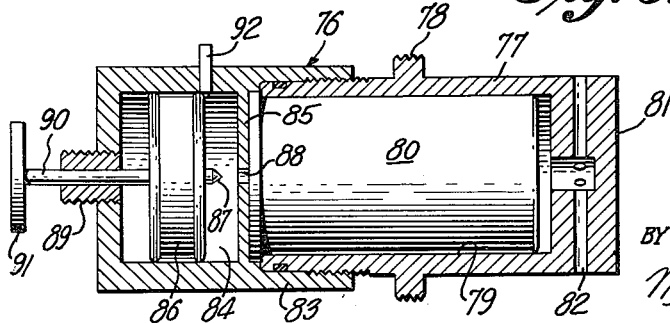
FIGURE 6 is a vertical longitudinal section view of a gas generator used in the launcher system for augmenting the exhaust gases in the free volume chamber.
Figure 5:
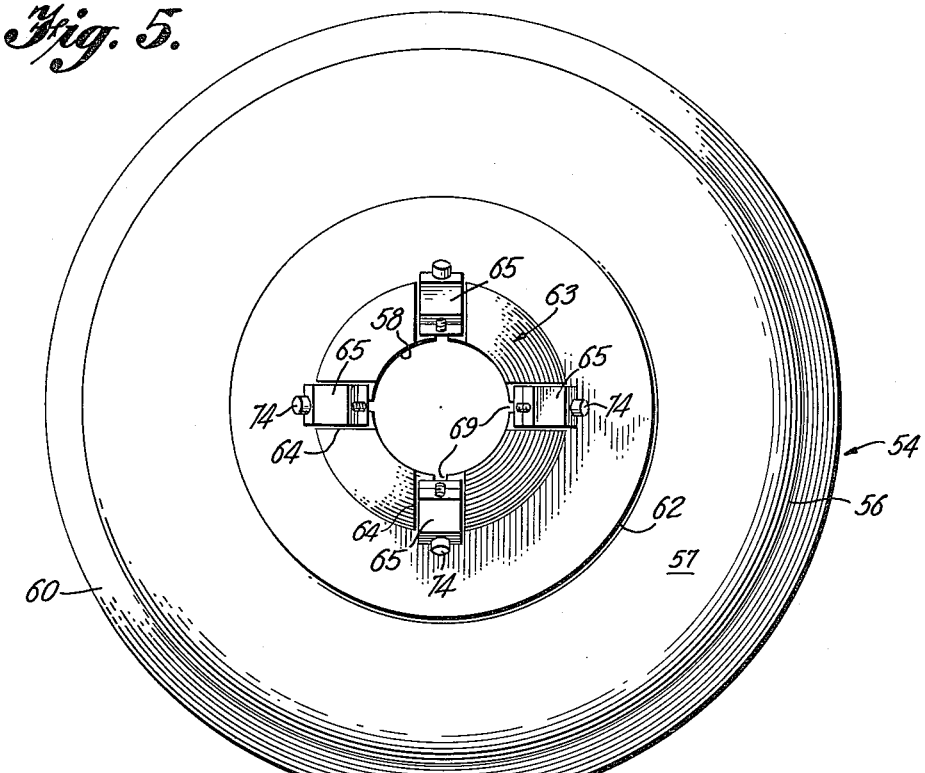
FIGURE 5 is a top plan view of the separable piston.

Referring to the drawings wherein like reference characters designate corresponding parts throughout the several figures, and particularly to FIGURES 1–3, the rocket launcher of the present invention, designated generally by the reference character 10, comprises an elongated launcher tube 11 of true circular cross-section having a muzzle end 12 and a breech end 13, a pressure modulating chamber 14 surrounding the breech end portion of the launcher tube 12 extending in concentric relationship about the launcher tube, the launcher tube and chamber assembly being mounted for adjustment in azimuth and elevation on a launcher support assembly indicated by the reference character 15.

The launcher support assembly 15 is arranged to permit tilting of the launcher tube and pressure modulating chamber assembly to a horizontal position for breech-type loading and to provide elevation adjustment of as much as 10° from vertical and to permit training of the launcher by turning in azimuth. To this end, the base end of the pressure modulating chamber 14 is hinged to an azimuth and elevation table assembly 16 by means of a hinge assembly 17 having a pivot pin 18 to permit the launcher tube 11 and chamber 14 to be tilted about the axis of the pivot pin 18. The azimuth and elevation table assembly may assume the form illustrated in the drawings wherein a bridging panel 19 extends diametrically across an annular azimuth ring 20 which is supported for rotation about its center by azimuth lock units 21 mounted on each of four horizontal supporting legs 22 forming a cross-shaped support. The support legs 22 are preferably formed of an inner stationary tubular sleeve 23 and an extension arm 24 telescopically supported in the sleeve 23 to permit extension of the supporting legs to the desired length, the outer end of each extension arm having a threaded member 25 thereon to receive a threaded adjustment screw 26 having a bearing plate 27 at the lower end thereof, or a threaded stake which may be driven into the ground and rotated to effect leveling of the launcher support assembly 15. A pivot stand 28 is also carried by and depends from the center of the launcher support assembly and includes an enlarged bearing plate 29 and a pivot point 30 such as a socket and head having a segmental surface of spherical curvature to permit tilting of the bearing plate 29 relative to the plane of the support legs 22.

The azimuth lock units 21 each comprise a guide block 31 welded to each of the support legs 22 at a proper distance from the junction of the four legs 22 so that the inner surfaces of each of the guide blocks 31 slidably abut the outer surface of the azimuth ring 20 and maintain the ring centered with respect to the juncture of the support legs 22, and a clamping plate 32 surmounting each of the guide blocks 31 and extending inwardly of the inner guide surface of the associated guide block 31 to bear against the top edge of the azimuth ring 20. A bolt 33 threaded into each of the guide blocks 31 and extending through the associated clamping plate 32 permits adjustment of the clamping plate 32 to frictionally lock the azimuth ring against rotation.

Welded or otherwise affixed to the lower corner of the pressure modulating chamber 14 at a point diametrically opposite the hinge assembly 17 is an elevation sector 34 having a toothed arcuate periphery 35 which is engaged by a lug 36 on the inner end of an axially reciprocal elevation lock member 37 supported in a bracket 38 mounted on the bridging panel 19 of the azimuth and elevation table. These components form an elevation index assembly, with the elevation lock member 37 resiliently biased or otherwise urged toward the elevation sector 34 to normally retain the lug 36 between a selected pair of the teeth on the toothed periphery 35 of the sector 34 and lock the launcher tube at the adjusted elevation setting.

The pressure modulating chamber 14 is generally in the form of a heavy walled closed cylindrical container having a continuous cylindrical outer wall 39 and annular top and bottom wall portions 40 and 41. The top of the annular top wall 40 of the pressure modulating chamber 14 forms the support for the launcher tube 11 and has a central aperture through which the launcher tube 11 projects. The launcher tube is provided with a rigid annular mounting flange 42 which is adapted to lap over the portions of the annular top wall 40 immediately bounding the central opening therein and be secured to the top wall 40 by bolt and nut units 43. The mounting flange 42 is suitably located lengthwise of the launcher tube 11 so as to dispose the breech end 13 of the launcher tube 11 a selected distance above the plane of the annular bottom wall 41 of the chamber 14. In order to provide an effective seal at the juncture of the mounting flange 42 and top wall 40, the top wall 40 may be provided with an annular groove 44 spaced slightly outwardly from the central opening in the top wall 40 and concentric with the axis of the top wall, in which is bonded an annular gasket 45 of neoprene or light flexible material to underlie and butt against the mounting flange 42.

The opening 46 in the bottom wall 41 of the chamber 14, which opening is preferably larger in diameter than the launcher tube 11, is normally closed by a circular cover plate 47 releasably held in place by conventional breech dogs 48 mounted on the lower surface of the annular bottom wall 41, the breech dogs 48 being of conventional construction including, for example, a pivoted clamping block 49 and operating handle 50.

The missile, indicated generally by the reference character 51, to be launched in the above-described launcher may be of the conventional rocket type having an elongated body 52 and guidance fins 53. Removably secured to the trailing or aft end of the rocket motor nozzle is the separable launcher piston assembly, indicated generally by the reference character 54, which is the subject of the present invention. Suitable retractable piston supports 55, in the form of pins or threaded screws adjustable along radial axes relative to the launcher tube, are provided in the wall of the launcher tube to support the assembled piston and rocket after the latter have been introduced into the launcher tube through its breech end.

Figure 4:
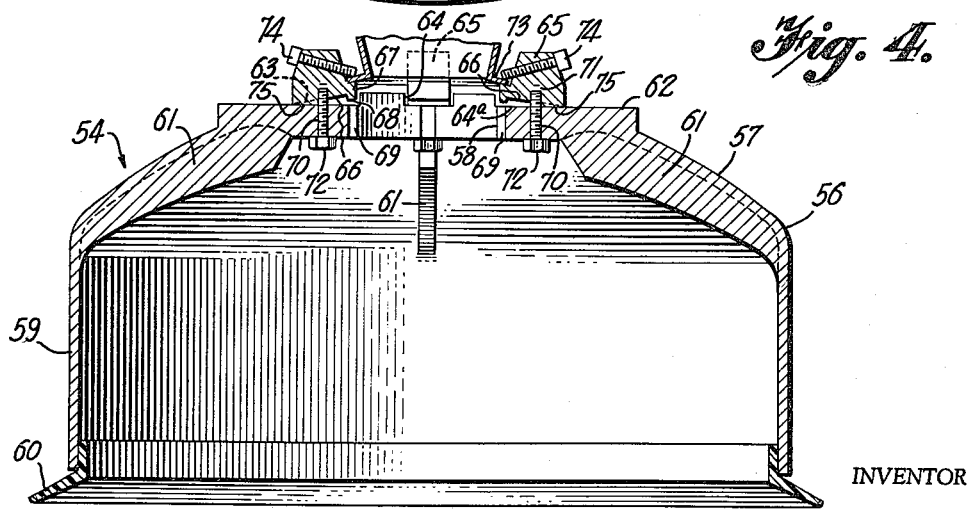
FIGURE 4 is a vertical, transverse section view to enlarged scale of one preferred form of separable launching piston embodying the present invention.

The novel launcher piston assembly 54 of the present invention comprises an integral cast piston body 56 of generally cup-shaped configuration opening toward the breech end of the launcher tube including a generally transverse wall portion 57 having a central aperture 58 therein and a rearwardly or downwardly extending annular flange 59, to the trailing end of which an annular sealing gasket 60 of suitable flexible material is bonded. The piston is provided with a plurality of internal reinforced ribs 61 and a forwardly or upwardly projecting boss 62 forming a platform-like extension having an interrupted annular inclined ramp formation 63 surrounding the central aperture 58 in the transverse wall portion 57. The inclined ramp formation 63 is interrupted at points spaced about 90° apart, in the exemplary embodiment, by wells 64 having parallel side walls between which are received rocker arm type releasable mounting blocks 65. The mounting blocks 65 normally occupy the position illustrated in FIGURE 4, wherein the bottom wall portion 66 adjacent the inwardly projecting foot 67 is inclined upwardly from the bottom 64a of the associated well and the downwardly projecting nose 68 on the foot portion 67 is spaced upwardly from the accommodating opening 69 in the piston. The mounting blocks 65 are restrained in this position by brittle pins 70 having threaded upper and lower ends, the threaded upper end being received in an inwardly threaded socket 71 in the associated mounting block 65 and the threaded lower end having a nut 72 thereon. An outwardly projecting lip or flange 73 on the trailing end of the rocket body 52 is adapted to be seated against the upwardly facing surface of the foot portion 67 of each mounting block 65 and initially restrained in intercoupled or interlocked relation with the mounting blocks by a threaded screw 74 threaded through each of the mounting blocks. The mounting blocks 65 are also provided with a bottom wall portion 75 in the outer zone thereof which is inclined relative to the inner bottom portion 66 and rests flat against the bottom 64a of the well 64 in the normal position of the mounting block 65. The breaking strength of the brittle pins 70 is so selected that the piston will be released from the rocket by breaking of the brittle pins as soon as the thrust against the piston becomes sufficiently greater than the thrust of the rocket to cause the mounting blocks 65 to tip inwardly and downwardly.

An auxiliary gas generator unit, designated generally by the reference character 76, may be mounted in the side wall 39 of the expansion chamber 14 to provide additional gas pressure acting on the piston 54 to accelerate the rocket. This gas generator unit in one preferred embodiment, comprises a hollow cylindrical body 77 having an externally threaded enlarged diameter portion 78 adapted to be coupled into an accommodating internally threaded opening in the side wall 39 of the expansion chamber and an internal bore 79 for housing a gas generator cartridge 80. The inner end of the tubular holder 77 is provided with a closure wall 81 having a plurality of radially extending vents 82 communicating with the bore 79 and opening into the interior of the expansion chamber 14. An outer closure 83 is threaded onto the tubular holder 77 and contains a cylinder 84 separated from the cartridge housing bore 79 by a transverse partition 85 and housing axially reciprocative piston 86. The piston 86 has a firing pin 87 on the face thereof adjacent the cartridge housing bore 79 to be projected through a suitable aperture 88 in the partition 85 and strike the percussion cap or other suitable firing device in the gas generator cartridge 80 when the piston reaches its inner limit position.

An externally threaded hose coupling sleeve 89 is fitted into a suitable threaded central aperture in the rear wall of the outer closure 83, through which the stem 90 of a piston withdrawing handle 91 may be projected. The inner end of the stem 90 is threaded and is adapted to be received in a complementary threaded socket in the outer portion of the piston 86 whereby the stem 90 of the handle 91 can be inserted through the bore in the coupling sleeve 89 and threaded into the socket therefor in the piston 86 to effect withdrawal or retraction of the piston 86 to a position wherein its inner wall lies rearwardly of a spring-pressed plunger 92 projecting into the cllinder 84 to resiliently restrain the piston 86 against inward movement from the retracted position. Following removal of the stem 90 from the bore of the coupling sleeve 89, one end of an air hose 93 is coupled to the coupling sleeve 89 and the other end of the air hose is placed in communication with either the interior of the pressure modulating chamber 14 or of the launcher tube 11. In one preferred embodiment, as illustrated in solid lines in FIGURE 3 of the drawings, the hose 93, which is a high-pressure, high-temperature hose of conventional construction, is placed in communication with the interior of the pressure modulating chamber 14 by a suitable fitting in the wall 39 thereof, and the adjustment of the spring plunger 92 is suhc that the piston 86 is retained in its retracted position until the pressure on the outer face of the piston reaches a sufficient value to overcome the spring tension. The piston 86 then moves forward to contact the percussion cap of the gas generator cartridge 80 and set off the charge. This pneumatic activating features assures that the rocket is properly united in the launcher before the gas generator is activated, and eliminates the problems inherent in a second electrical ignition system.

In another preferred form, the end of the air hose 93 remote from the gas generator may be placed in communication with the interior of the launcher tube 11, as illustrated in broken lines in FIGURE 1 of the drawings, at a suitable position along the launcher tube so that the piston 86 will not be subjected to the pressures developed in the pressure modulating chamber 14 until the piston 56 passes the position of the sensory end 94 of the hose 93. By this arrangement, actuation of the auxiliary gas generating unit may be limited to a point past the pressure peak which would be produced by the pressure modulating chamber without an auxiliary gas generator, thereby minimizing peak acceleration and resonance without sacrifice in increased exit velocity.

Since the guidance fins 53 project radially beyond the rocket body 52 in conventional rocket configurations, packing sections 95 are provided which fit between the fins of the rocket and extend a substantial distance along the rocket body. The packing sections 95 are configurated to abut the slides of the rocket body 52 and engage the inner surface of the launcher tube 11 at sufficient points to prevent the rocket from wobbling in the launcher tube prior to firing. One preferred embodiment is illustrated in the drawings wherein each of the packing sections 95 engage the inner surface of the launcher tube 11 at two circumferentially spaced points. The packing sections are preferably made of a light weight, heat insulating material, for example foamed plastics such as "Styrofoam" or foamed polyurethane, to minimize dead load.

In order to accomplish the objects of this invention, the pressure modulating chamber 14 should provide a large initial volume into which the gases can expand. The pressure modulating chamber generally should have a volume equal to at least about 5 and preferably 10 times the volume increase produced by movement of the racket one foot up the launcher tube. The function of of the pressure modulating chamber 14 to accomplish the functions of tempering initial acceleration on the rocket, maintaining substantially constant acceleration on the rocket as it proceeds through the launching tube, and increasing initial velocity of the rocket, will be more clearly understood from consideration of the mathematical relationships describing pressurization of the launcher. The pressurization of the launcher can be described by the general gas law:

$$\frac{P(V_I + \Delta V)}{T} = K$$

where:

K is a constant
P is the pressure (which is proportional to acceleration)
$V_I$ is the initial volume behind the rocket in which the rocket exhaust gases are accumulated
$\Delta V$ is the volume increase due to the rocket traveling up the launcher tube
T is the temperature Since the temperature remains relatively constant, this relationship can be stated, for all practical purposes, to be $P(V_I + \Delta V) = K$.

From this relationship, it will be apparent that on ignition, the pressure (and the acceleration) will vary inversely with the initial volume $V_I$. Thus if the initial volume is very small, the pressure will be very high and there will be very high initial acceleration of the rocket. As the initial volume $V_I$ provided by the launcher becomes larger, the initial pressure and acceleration becomes smaller, since the product of these two factors must equal a constant.

To maintain maximum and relatively impulse free acceleration, it is necessary that the increase in volume, $\Delta V$, as the rocket travels up the launcher tube, be small relative to the initial volume $V_I$. The small $\Delta V$ factor relative to the large initial volume factor $V_I$, minimizes change in the pressure factor P and, thereby, acceleration. By providing a large initial volume behind the rocket in which the rocket's exhaust gases are accumulated, for example, in the form of the large volume pressure-modulating chamber 14 in communication with the breech of the launching tube 11, the desired conditions can be achieved.

To load the launcher, the operator withdraws the elevation lock member 37 to release the lug 36 from the teeth of the elevation sector 34 and swings the launcher tube 11 and pressure modulating chamber 14 about the pivot pin 18 of the hinge assembly 17 to decline the axis of the launcher tube 11 to a substantially horizontal position. The breech dogs 48 are then actuated to release the cover plate 47 and the cover plate 47 is withdrawn from the breech opening 46, thereby exposing the rear end of the chamber 14 and launcher tube 11 for insertion of the rocket therein. The piston assembly 54 is then assembled onto the trailing end of the rocket by seating the outwardly flaring lip 73 at the exit end of the nozzle on the feet 67 of the mounting blocks 65 and adjusting the screws 74 to couple these elements together. The packing sections 66 are then fitted about the fins and adjacent body portions of the rocket and the assembled rocket, packing sections and piston assembly are then inserted through the breech opening 46 and breech end 13 of the launcher tube 11 while the retractable piston supports 55 are retracted from the bore of the launcher tube. The piston supports 55 are then projected into the bore of the launcher tube to form rests for the trailing edges of the peripheral flange 59 of the piston assembly 54. The cover plate 47 is then supported over the breech opening 46 and the breech dogs 48 shifted to cover plate locking position, and the launcher tube 11 and chamber 14 are swung upwardly to vertical position. The elevation lock member 37 is then actuated to fit the lug 36 between a set of the teeth of the elevation sector 35 appropriate for the particular elevation seating desired. The launcher tube 11 and chamber 14 may be trained in azimuth by loosening the bolts 33 and clamping plates 32 and rotating the azimuth ring 20 to the desired azimuth position, whereupon the bolts 33 may be tightened to lock the clamping plates 32 against the edge of the azimuth ring 20.

Upon ignition of the rocket fuel, for example, by a conventional igniter and ignition leads operated from any suitable power source, the exhaust gases accumulate in the pressure modulating chamber 14 and begin to build up pressure on the piston assembly 54. The speed of pressure build up is of course determined by the volume of the pressure modulating chamber 14, and the position of the rocket exhaust nozzle relative to the breech end 13 of the launcher tube 11. For a finite period, rocket thrust is higher than modulating chamber pressure on the launching piston 56. Shearing or separation of the mounting blocks 65 during this period would release the rocket and destroy the additional thrust function of the launcher. However, the mounting blocks 65 cause the launching piston 56 to be carried along with the rocket until the pressure of the accumulated exhaust gases in the modulating chamber 14 produces a thrust against the launching piston 56 which is greater than the reaction thrust of the rocket. When the thrust against the piston 56 exceeds the rocket thrust, the mounting blocks 65 are caused to tip down, projecting the nose 68 into the hole 69 and breaking the brittle pin 70 holding the mounting block 65 on the piston 56. The mounting block 65 continues to hold the rocket 52 in alignment with the launching piston 56 during the travel of the rocket up the launching tube 11 so long as the pressure on the piston exceeds rocket thrust, until the rocket and launching piston 56 exit from the tube 11, whereupon the piston 56 is free to fall away.

At some point during the travel of the rocket and launching piston 56 through the tube 11, the auxiliary gas generator unit 76 is actuated, either by achievement of a preselected pressure level in the pressure modulating chamber 14 or by a combination of achievement of a selected pressure level and movement of the launching piston 56 to a position just beyond the sensing end 94 of the hose 93. Thereupon, the pressure on the rear or outer face of the piston 86 in the gas generator unit exceeds the restraining force of the spring plunger 92 and causes the piston 86 to be slammed inwardly, detonating the percussion cap of the gas generator cartridge 80 and admitting additional gas to the pressure modulating chamber 14 through the vent openings 82 to produce further increase in the pressure against the launching piston 56.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A launching piston assembly to be releasably coupled to outwardly projecting elements of a rocket device to be located in an elongated launcher tube between a rear breech end and an exit end thereof, and to respond to pressure of entrapped gases rearwardly of the launching piston assembly to impart additional launching thrust to the rocket, thereby assisting the reaction thrust of the rocket motor in expelling the rocket from the launcher tube, comprising an integral piston body for transversely spanning the launcher tube and having an opening therein for passage of exhaust gases from the rocket rearwardly therethrough, said piston body forming a gas pressure barrier which is freely displaceable through the launcher tube in response to gas pressure rearwardly thereof, a plurality of releasable mounting rocking members extending forwardly of said piston body, brittle connector members supporting said rocking members in a normal coupling position on said piston body, means intercoupling said rocking members with said projecting elements to cause the rocking members and rocket to transmit movement axially of the launcher each to the other, the bottom of said rocking members having portions shaped to permit inward rocking movement of the rocking members from their normal coupling position, said connector members have a low breaking strength to cause the connector members to be broken by movement of the piston body toward the exit end of the launcher tube relative to the rocket to release the connection between said rocking members and said piston body and to permit the piston body to fall away from the rocket when the reaction thrust of the rocket exceeds the expelling thrust produced by the entrapped gases on the piston body following breakage of the connector members.

2. A launching piston assembly to be releasably coupled to outwardly projecting elements of a rocket device to be located in an elongated launcher tube between a rear breech end and an exit end thereof and to respond to pressure of entrapped gases rearwardly of the launching piston assembly to impart additional launching thrust to the rocket, thereby assisting the reaction thrust of the rocket motor in expelling the rocket from the launcher tube, comprising an inegral piston body for transversely spanning the launcher tube and having an opening therein for passage of exhaust gases from the rocket rearwardly therethrough, said piston body forming a gas pressure barrier which is freely displaceable through the launcher tube in response to gas pressure rearwardly thereof, a plurality of releasable mounting members disposed forwardly of said piston body having a normal coupling position and projections extending radially inwardly rearwardly of and immediately adjacent said outwardly projecting elements of the rocket to bear against the rear surface of said outwardly projecting elements, adjustable means on said mounting members projecting forwardly of said outwardly projecting elements immediately adjacent the same for drawing the mounting members along with the rocket responsive to movement of the latter through the launcher tube, the bottoms of said mounting members having portions shaped to permit inward rocking movement of the mounting members from their normal coupling position, brittle connector means forming the sole means securing said mounting members to said piston body rigidly restraining said mounting members in said normal coupling position and having a low breaking strength to cause the connector means to be broken by movement of the piston body toward the exit end of the launcher tube relative to the rocket to release the connection between said mounting members and said piston body and permit the piston body to fall away from the rocket when the reaction thrust of the rocket exceeds the expelling thrust produced by the entrapped gases on the piston body following breakage of the connector means.

3. A launching piston assembly to be releasably coupled to an annular, outwardly flaring, rocket nozzle lip of a rocket device to be located in an elongated launcher tube between a rear breech end and an exit end thereof and to respond to pressure of entrapped gases rearwardly of the launching piston assembly to impart additional launching thrust to the rocket, thereby assisting the reaction thrust of the rocket motor in expelling the rocket from the launcher tube, comprising an integral piston body spanning the launcher tube and having a central opening therein for passage of exhaust gases from the rocket rearwardly therethrough, said piston body forming a gas pressure barrier which is freely displaceable through the launcher tube in response to gas pressure rearwardly thereof, a plurality of releasable mounting rocking blocks disposed forwardly of said piston body having a normal coupling position wherein said blocks extend forwardly alongside said lip immediately outwardly thereof, said blocks having inwardly extending projections to bear against the rear surface of said lip, adjustable means on said mounting blocks projecting forwardly of said lip for loosely intercoupling the blocks thereto to be drawn along with the rocket upon movement of the latter through the launcher tube, the bottoms of said mounting blocks having portions shaped to permit inward rocking movement of the mounting blocks from their normal coupling position, brittle connector means forming the sole means securing said mounting blocks to said piston body rigidly restraining said mounting blocks in said normal coupling position and having a low breaking strength to cause the connector means to be broken by movement of the piston body toward the exit end of the launcher tube relative to the rocket to release the connection between said mounting blocks and said piston body and to permit the piston body to fall away from the rocket when the reaction thrust of the rocket exceeds the expelling thrust produced by the entrapped gases on the piston body following breakage of the connector means.

4. A launching piston assembly to be releasably coupled to an annular outwardly flaring rocket nozzle lip of a rocket device to be located in an elongated launcher tube between a rear breech end and an exit end thereof and to respond to pressure of entrapped gases rearwardly of the launching piston assembly to impart additional launching thrust to the rocket, thereby assisting the reaction thrust of the rocket motor in expelling the rocket from the launcher tube, comprising an integral piston body in the form of a rearwardly opening cup-shaped casting spanning the launcher tube and having a transverse wall portion and a central opening therein for passage of exhaust gases from the rocket rearwardly therethrough, said piston body forming a gas pressure barrier which is freely displaceable through the launcher tube in response to gas pressure rearwardly thereof, a plurality of releasable mounting rocking blocks disposed forwardly of said piston body having a normal coupling position wherein said blocks extend forwardly alongside said lip immediately outwardly thereof, said blocks having inwardly extending feet providing shoulders to bear against the rear surface of said lip and to urge the rocket toward said exit end upon corresponding movement of the piston assembly responsive to gas pressure rearwardly thereof, adjustable means on said mounting blocks projecting forwardly of said lip for loosely intercoupling the blocks thereto to be drawn along with the rocket upon movement of the latter through the launcher tube, the bottoms of said mounting blocks having portions shaped to permit inward rocking movement of the mounting blocks from their normal coupling position, brittle elongated connector elements extending through said transverse wall and into said blocks forming the sole means securing said mounting blocks to said piston body rigidly restraining said mounting blocks in said normal coupling position, means restraining said blocks against rotary movement about the axes of said connector elements, said elements having a low breaking strength to cause the connector elements to be broken by rocking of the blocks upon movement of the piston body toward the exit end of the launcher tube relative to the rocket to release the connection between said mounting blocks and said piston body and to permit the piston body to fall away from the rocket when the reaction thrust of the rocket exceeds the expelling thrust produced by the entrapped gases on the piston body following breakage of the connector elements.

References Cited in the file of this patent

UNITED STATES PATENTS

| | | |
|---|---|---|
| 2,657,630 | Blacker | Nov. 3, 1953 |
| 2,715,874 | Hablutzel et al. | Aug. 23, 1955 |